June 12, 1962  R. E. HALVERSON  3,038,357
DRILL JIG
Filed Dec. 9, 1960
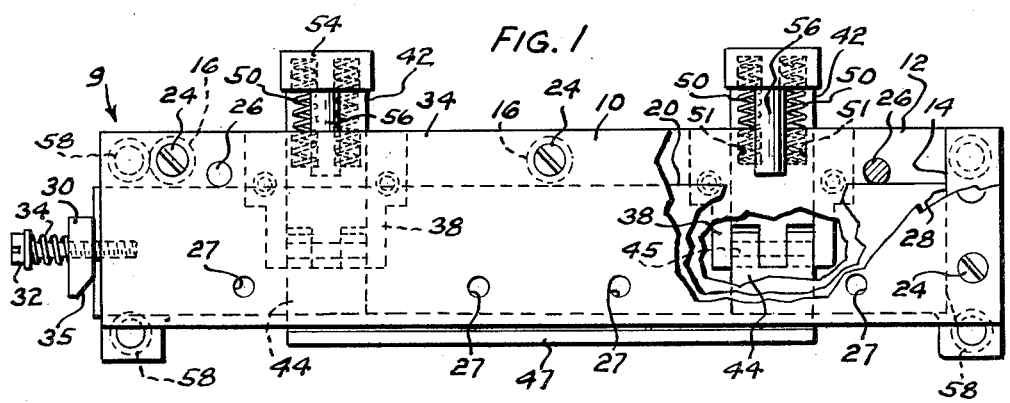
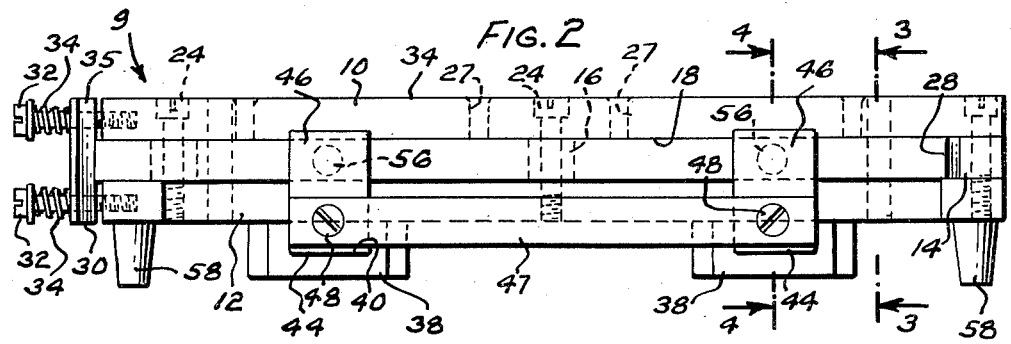
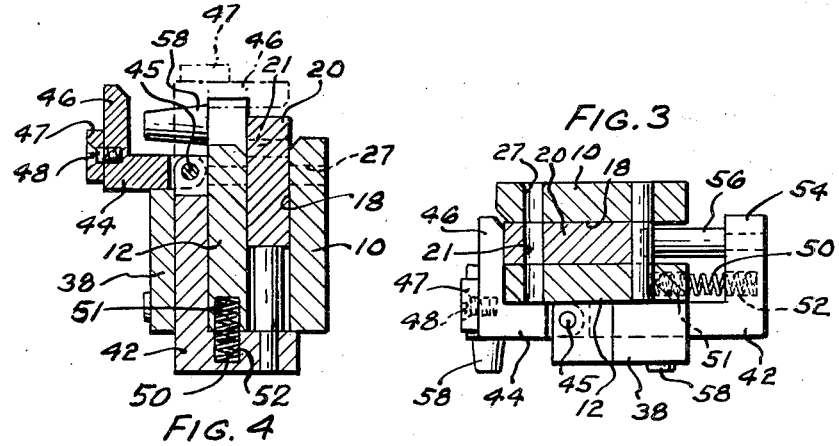
INVENTOR
R. E. HALVERSON
BY A.C. Schwarz, Jr.
ATTORNEY United States Patent Office 3,038,357
Patented June 12, 1962

3,038,357
DRILL JIG
Richard E. Halverson, Westchester, Ill., assignor to Western Electric Company, Incorporated, New York, N.Y., a corporation of New York
Filed Dec. 9, 1960, Ser. No. 74,803
6 Claims. (Cl. 77—62)

This invention relates to drill jigs, and more particularly to work positioning devices permitting rapid loading and unloading of the work.

An object of the invention is to provide an improved drill jig permitting rapid loading and unloading of the work.

Another object of the present invention is to provide a device for supporting an article and guiding a tool thereto and having mechanism for facilitating the insertion and removal of the article.

With these and other objects in view, the invention contemplates the provision of a work holder having a recess for receiving an article therein and having a guide aperture for directing a tool into engagement with the article. A slide mounted on the holder for rectilinear movement has an ejector member secured thereto for ejecting the article partially from the holder in response to movement of the slide in one direction to a first position. A retaining element is mounted on the slide for pivotal movement from an open position spaced from the article to a closed position in engagement with the article and, when in closed position, the retaining element is movable with the slide to a second position for retaining the article in the holder.

When the slide is moved to its second position, the retaining element is held in closed position, and when the slide is moved to the first position, the retaining element is released for pivotal movement to open position. The slide is spring urged to the second position with a portion of the slide projecting beyond the holder so that on completion of the drilling of the article, an operator may push the jig and the projecting end of the slide against a stationary surface to effect movement of the slide to the first position resulting in the partial ejection of article from the holder and the release of the retaining element whereby the retaining element may be swung to open position, the drilled article removed from the holder, and an undrilled article placed therein.

Other objects, advantages and novel aspects of the invention will become apparent upon consideration of the following detailed description, in conjunction with the accompanying drawings, in which:

FIG. 1 is a plan view of the drill jig embodying the present invention;

FIG. 2 is a front elevational view of the drill jig;

FIG. 3 is a cross sectional view of the drill jig taken on line 3—3 of FIG. 2; and FIG. 4 is a cross sectional view of the drill jig taken on line 4—4 of FIG. 2 and showing the jig in unloading position.

Referring to the drawings, the drill jig 9 comprises a pair of flat elongated plates 10 and 12 disposed in parallel and spaced relation to each other by a spacer 14 at one end thereof and a plurality of spacers 16 along one side thereof to form a recess 18 between the plates for receiving an elongated flat rectangular article 20 in which a series of holes 21 are to be drilled. The plates 10 and 12 are secured in fixed and parallel relation to each other by screws 24 disposed in aligned apertures in the plates and the spacers.

A pair of gage pins 26 are secured to and extend between the plates 10 and 12 adjacent one longitudinal margin thereof to provide gage surfaces engageable with one edge of the article 20 to position the article in one direction within the jig relative to a plurality of drill apertures 27 in the plates 10 and 12. The surface 28 of the end spacer 14 engages one end of the article 20 and serves as a gage to locate the article accurately in a longitudinal direction in the jig.

The opposite end of the article 20 is engaged by a member 30 which is slidably mounted on the shanks of a pair of headed screws 32 secured to the ends of the plates 10 and 12. A pair of springs 34 urge the member 30 to the right as viewed in FIG. 1 into engagement with the article 20 to yieldably maintain the article against the gaging surface 28. The end spacer 14 and the spring loaded member 30 are provided with sloping surfaces 35 to facilitate the loading of an article into the jig.

From the description thus far and an inspection of the drawings it will be seen that the spaced plates 10 and 12, the spacers 14 and 16 and the gage pins 26 and the member 30 form a composite article holder 34 provided with a recess 18 for receiving the article therein and locating it in a predetermined position relative to the drill guide apertures 27.

A pair of U-shaped guide members 38 (FIG. 2) secured to the underside of the lower plate 12 form a pair of guideways 40 for receiving a pair of slides 42 therein. Retaining elements 44 are pivotally connected at one end thereof to the extremities of the slides 42 by pivot pins 45. Transversely directed retaining fingers 46 on the elements 44 are engageable with one edge of the article 20 and are interconnected by a cross bar 47 and screws 48 for simultaneous movement of the elements 44. When the slides 42 have been moved to a first position, the retaining elements 44 are positioned out of the guideway 40 and beyond the guides 38 and are freely pivotable about the pins 45 on the slide 42 to a closed position in engagement with the plate 12 as shown in dotted lines in FIG. 4 and with the retaining finger 46 aligned with the article 20, and to an open position as shown in full lines with the retaining finger 46 moved from the article 20 and the path of travel thereof. When the retaining elements 44 have been swung to their closed position the elements 44 are aligned with the guideways 40 and may be moved thereinto (FIG. 3) in which position a portion of the guide 38 serves to hold the retaining elements 44 in their closed position.

The slides 42 are urged to the right to a second position as viewed in FIG. 3 by springs 50 to cause the retaining fingers 48 yieldably to maintain the article 20 in aligned position relative to the drill guide apertures 27 of the jig 9. The springs 50 at one end are seated in recesses 51 in the plate 12 and are seated at their other ends in recesses 52 in transversely extending portions 54 of the slides 42.

Ejecting pins 56 are secured to the transversely extending portions 54 of the slides 42 and project into the recess 18 between the plates 10 and 12 for engaging the article 20 and moving it partially from the recess 18 in response to movement of the slides 42 to the first position as shown in FIG. 4. A plurality of feet 58 (FIG. 2) are secured to the underside of the lower plate 12 to support the jig in a horizontal position on a table or other surface of a drill press during the drilling of the holes 21 into the article 20.

On completion of the drilling operation, the jig 9 with drilled article 20 therein is turned 90° with the projecting portions 54 of the slides 42 directed downwardly. The jig is then moved downwardly to bring the projecting portions 54 of the slides into engagement with a supporting surface to effect the arresting of the movement of the slides 42 as the holder 34 continues its movement downwardly relative to the slides 42, the ejector pins 56 thereon, and the retaining elements 44. This downward movement of the holder 34 relative to the slides 42 brings the guide members 38 below the pivot pins 45 thereby releasing the retaining elements 44 and permitting them to be manually pivoted about the pins 45 to open position as shown in full lines in FIG. 4. The article 20 during this downward movement of the holder 34 engages the ends of the ejector pins 56 and is supported thereby as the holder 34 descends to its lower position, resulting in the partial ejection of the article 20 from the recess 18 of the holder 34 and the location of the article in a position where it is readily accessible for removal from the jig.

After the drilled article has been removed, another undrilled article 20 may be inserted in the recess 18 of the holder 34 after which the retaining elements 44 may be moved to closed position and the holder 34 raised, during which the springs 50 temporarily hold the slides 42 stationary to effect the movement of the gage pins 26 into engagement with the article 20, the withdrawal of the ejector pins 56 from the article and the engagement of the retaining elements 46 with the article to yieldably retain it in the jig in a predetermined relation to the drill guide apertures 27.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device of the type described comprising a holder having a recess for receiving and supporting an article in a predetermined position on the holder and having a guide for directing a tool into engagement with a predetermined portion of the article, a slide mounted on said holder, an ejector member mounted on said slide for moving the article from the predetermined position on said holder in response to movement of said slide in one direction to a first position, a retaining element movable with said slide in the opposite direction to a second position for retaining the article in the predetermined position on said holder, means for mounting said retaining element on said slide for movement therewith and for movement transversely thereof to a closed position in alignment with the article and to an open position spaced from the article, and means on said holder for maintaining said retaining element in closed position when said slide is in said second position and for releasing said retaining element for movement to open position when said slide is in said first position.

2. A jig comprising a holder having a recess for receiving an article therein and having a guide for directing a tool into engagement with the article, a slide mounted on said holder for rectilinear movement, an ejector member mounted on said slide for ejecting the article from said holder in response to movement of said slide in one direction to a first position, a retaining element movable with said slide in the opposite direction to a second position for retaining the article in said holder, means for pivotally mounting said retaining element on said slide for rectilinear movement therewith and for pivotal movement thereon to and from a closed position in alignment with the article and an open position spaced from the article, means on said holder for maintaining said retaining element in closed position when said slide is in said second position and for releasing said retaining element for free pivotal movement when said slide and said retaining element are in said first position, and means for moving said slide to said first and said second positions.

3. A jig comprising a holder having a recess for receiving an article therein and having a guide for directing a tool into engagement with the article, a slide mounted on said holder for rectilinear movement, an ejector member mounted on said slide for ejecting the article from said holder in response to movement of said slide member in one direction to a first position, a retaining element movable with said slide in the opposite direction to a second position for retaining the article in said holder, means for mounting said retaining element on said slide for movement therewith and for movement transversely of said rectilinear movement to a closed position in alignment with the article and to an open position spaced from the article, means on said holder for maintaining said retaining element in closed position when said slide is in said second position and for releasing said retaining element for transverse movement to open position when said slide is in said first position, resilient means for urging said slide to said second position, and means for moving said slide to said first position.

4. A device of the type described comprising a holder having a recess for receiving an article therein and having an aperture for directing a tool into engagement with the article, a guide member on said holder forming a guideway disposed parallel to the movement of the article into said recess, a slide mounted in said guideway for movement in one direction to a first position and for movement in the opposite direction to a second position, a retaining element pivotally connected to said slide, said element being located outside of said guideway for free pivotal movement to a closed position in alignment with the article and to an open position spaced from the article when said slide is in said first position and said element being disposed within said guideway and held in closed position by said guide member when said slide is in said second position, and resilient means for urging said slide to said second position.

5. A jig comprising a holder having a recess for receiving an article therein and having an aperture for guiding a tool into engagement with the article, a guide member on said holder forming a guideway disposed parallel to the movement of the article into said recess, a slide mounted in said guideway for movement in one direction to a first position and for movement in the opposite direction to a second position, a retaining element pivotally connected to said slide, said element being located outside of said guideway for free pivotal movement to a closed position in engagement with an article and to an open position spaced from the article when said slide is in said first position and said element being disposed within said guideway and held in closed position by said guide member when said slide is in said second position, resilient means for urging said slide to said second position, and an ejector member mounted on said slide for moving the article from said holder in response to movement of the slide to said first position.

6. A jig comprising a holder having a tool guide aperture and a recess disposed transversely of said aperture for receiving an article therein, gage means on said holder for arresting the movement of the article into said recess and for locating the article in a predetermined position relative to said tool guide aperture, a slide, a guide member on said holder forming a slideway for supporting said slide for movement and with a portion of said slide projecting from said holder, an ejector member mounted on said slide for movement therewith and operable in response to the movement of said slide to a first position for moving the article from said gage means to eject the article partially from said holder, a retaining member pivotally connected to said slide for movement thereon to a closed position aligned with the article, said retaining element when in closed position being movable with said slide to a second position to retain the article in engagement with said gage means, said retaining element being located outside of said guideway when said element is in said first position and being freely pivotable to and from open and closed positions and a portion of said retaining element being positioned within said guideway and held by said guide member in said closed position when said element is in said second position, and means for moving said slide to said first and said second positions.

References Cited in the file of this patent

Centralizing Drill Jig, page 132, Feb. 4, 1952, "American Machinist" magazine.